United States Patent [19]

Bopp et al.

[11] 4,155,898

[45] May 22, 1979

[54] FLAME RETARDANT BLEND COMPRISING A POLYALKYLENE TEREPHTHALATE, AN ORGANO POLYSILOXANE-POLYCARBONATE BLOCK COPOLYMER, AND A HALOGENATED COPOLYCARBONATE

[75] Inventors: Richard C. Bopp, Ballston Lake, N.Y.; Samuel Miller, Louisville, Ky.

[73] Assignee: General Electric Company, Schenectady, N.Y.

[21] Appl. No.: 869,109

[22] Filed: Jan. 13, 1978

[51] Int. Cl.$^2$ ............... C08L 67/02; C08L 69/00; C08L 83/06
[52] U.S. Cl. .................. 260/40 R; 260/824 R; 260/860; 260/45.75 B
[58] Field of Search .......... 260/824 R, 860, 40 R

[56] References Cited

U.S. PATENT DOCUMENTS

| | | | |
|---|---|---|---|
| 3,686,355 | 8/1972 | Gaines et al. | 260/824 R |
| 3,855,277 | 12/1974 | Fox | 260/860 |

OTHER PUBLICATIONS

Brandrup, J. et al., *Polymer Handbook*, (1966), Interscience Publishers, pp. IV 359 & IV 361.

*Primary Examiner*—Wilbert J. Briggs, Sr.
*Attorney, Agent, or Firm*—F. Wesley Turner; Joseph T. Cohen; Charles T. Watts

[57] ABSTRACT

A polymer blend comprising a polyalkylene terephthalate, an organopolysiloxane-polycarbonate block copolymer, and a halogenated copolycarbonate having improved impact, heat distortion and flame retardant properties. The polymer blends can be molded or formed into films, sheets, fibers, laminates, or other improved molded articles of manufacture, including reinforced articles by conventional techniques.

10 Claims, No Drawings

FLAME RETARDANT BLEND COMPRISING A POLYALKYLENE TEREPHTHALATE, AN ORGANO POLYSILOXANE-POLYCARBONATE BLOCK COPOLYMER, AND A HALOGENATED COPOLYCARBONATE

CROSS REFERENCE TO RELATED APPLICATIONS

This invention is related to subject matter disclosed in the copending U.S. application Ser. Nos. 868,023, 867,985, and 868,021, filed on Jan. 9, 1978, respectively. All of the aforesaid applications are assigned to the assignee of this application. All of the disclosures referenced therein are incorporated herein in their entirety by reference.

BACKGROUND OF THE INVENTION

1. Field of the Invention

This invention relates to improved flame retardant polymer blends comprising a polyalkylene terephthalate resin, an organopolysiloxane-polycarbonate block copolymer and a flame retardant additive. The polymer blends have improved mechanical properties based on impact values and oxygen index values when compared to the same properties associated with polyalkylene terephthalate resins containing a halogenated copolycarbonate flame retardant additive.

2. Description of the Prior Art

LeGrand and Yee recognized—as broadly disclosed in the U.S. patent application Ser. No. 868,023—that blends of certain polyalkylene terephthalate resins and organopolysiloxane-polycarbonate block copolymers have improved mechanical properties including improved heat distortion temperatures and impact values.

Bopp recognized—as disclosed in U.S. patent applications Ser. Nos. 867,985 and 868,021—that blends of polyalkylene terephthalate resins and polysiloxanes have improved mechanical properties including improved heat distortion temperatures, impact and oxygen index values, and unexpectedly—that blends of nonreinforced low molecular weight polyalkylene terephthalate resins and organopolysiloxane-polycarbonate block copolymers have improved mechanical properties including heat distortion temperatures and impact values, respectively.

Although LeGrand et al. and Bopp recognized the improved mechanical properties associated with polyalkylene terephthalate organopolysiloxane-polycarbonate block copolymer blends and polyalkylene terephthalate polysiloxane blends, they did not recognize that blends of polyalkylene terephthalates and organopolysiloxane-polycarbonate block copolymers that contain specific flame retardant additives have still further improved mechanical and chemical properties.

DESCRIPTION OF THE INVENTION

This invention embodies flame retardant polyalkylene terephthalate and organopolysiloxane-polycarbonate block copolymer blends containing halogenated flame retardant additives. These blends exhibit improved mechanical properties including improved impact and heat distortion characteristics as well as oxygen index values.

The "polyalkylene terephthalate resin" can be any resin comprising a poly(1,4-alkylene terephthalate) having repeating units of the general formula

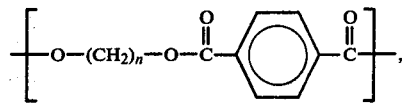

n being a number of from 1 to 50. The poly(1,4-alkylene terephthalate resins can contain mixtures thereof, including copolyesters, i.e. esters that contain a minor amount, e.g. from about 0.5 to about 2% by weight, of repeating units derived from an aliphatic or another aromatic dicarboxylic acid and/or another aliphatic diol or polyol. Among the units which can be present in the copolyesters are those derived from aliphatic dicarboxylic acids, e.g. acids having up to about 50 carbon atoms, including cycloaliphatic, straight and branched chain acids, such as adipic acid, cyclohexanediacetic acid, dimerized $C_{16-18}$ unsaturated acids (which have 32 to 36 carbon atoms), trimerized such acids, and the like. Among the units in the copolyesters can also be minor amounts derived from aromatic dicarboxylic acids, e.g. acids having up to about 36 carbon atoms, such as isophthalic acid and the like. In addition to polybutylene terephthalate (PBT) units derived from 1,4-butylene glycol, there can also be minor amounts of units derived from other aliphatic glycols and polyols, e.g. di- and polyols having up to about 50 carbon atoms, including ethylene glycol, propylene glycol, cyclohexanediol, and the like. Such copolyesters can be made by techniques well-known to those skilled in the art including techniques taught by Winfield et al., U.S. Pat. No. 2,465,319; Pengilly, U.S. Pat. No. 3,047,539, among others.

Illustratively, presently preferred PBT resin blend components will have an intrinsic viscosity of at least 0.2, and preferably at least about 0.8 deciliters per gram (dl./g.) as measured in o-chlorophenol, a 60/40 phenoltetrachloroethane mixture or a similar solvent at 25°–30° C. The upper intrinsic viscosity limit is not critical, however will generally be about 2.5 dl./g. Especially preferred PBT resin components will have an intrinsic viscosity within the range of from about 0.5 to about 1.3 dl./g.

The "organopolysiloxane-polycarbonate block copolymer" can be any copolymer comprising organopolysiloxane-polycarbonate blocks having repeating units of the general formulae:

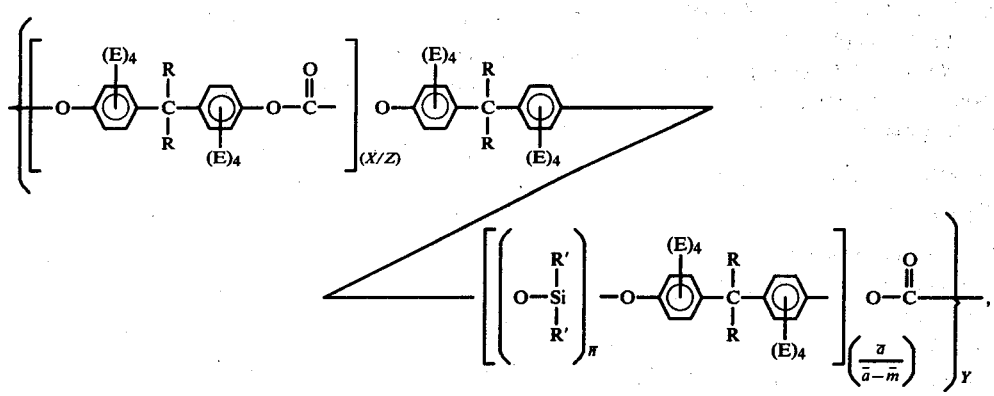

where X is an integer equal to 1 to 1000, inclusive, preferably 2 to 100, Z is equal to 1, $\bar{n}$ is a number average equal to 1 to 100, inclusive, preferably 5 to 40, $\bar{a}$ is a number average equal to 1.1 to 100, $\bar{m}$ is equal to 1, and Z is an integer equal to 1 to 1000, inclusive, preferably 5 to 12. E, R, and R' being as defined hereinafter.

Illustrative of well known organopolysiloxane-polycarbonates are described by the following general formulae:

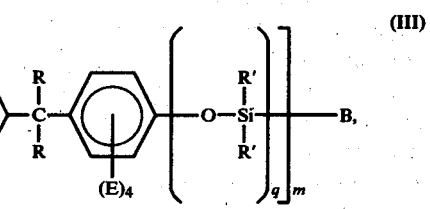

where m is at least 1, and preferably m is an integer equal to from 1 to about 1,000, inclusive, p is equal to from 1 to about 200, inclusive, q is equal to from about 5 to about 200, inclusive, and preferably q has an average value from about 10 to about 90, inclusive, while the ratio of p to q can vary from about 0.005 to about 40, inclusive. B is

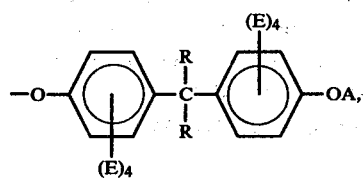

A is a member selected from the class of hydrogen and

R is a member selected from the class of hydrogen, monovalent hydrocarbon radicals and halogenated monovalent hydrocarbon radicals, R' is a member selected from the class of monovalent hydrocarbon radicals, halogenated monovalent hydrocarbon radicals and cyanoalkyl radicals, R" is a member selected from the class consisting of monovalent hydrocarbon radicals and halogenated hydrocarbon radicals, and E is a member selected from the class of hydrogen, lower alkyl radicals and halogen radicals and mixtures thereof.

Included within the radicals represented by R of Formulas II and III are aryl radicals and halogenated aryl radicals such as phenyl, chlorophenyl, xylyl, tolyl, etc.; aralkyl radicals such as phenylethyl, benzyl, etc.; aliphatic, haloaliphatic and cycloaliphatic radicals such as alkyl, alkenyl, cycloalkyl, haloalkyl including methyl, ethyl propyl, chlorobutyl, cyclohexyl, etc.; R can be all the same radical or any two or more of the aforementioned radicals, while R is preferably methyl, R' includes all radicals included by R above except hydrogen, where R' also can be all the same radical or any two or more of the aforementioned R radicals except hydrogen and R' is preferably methyl. R' also includes, in addition to all the radicals included by R, except hydrogen, cyanoalkyl radicals such as cyanoethyl, cyanobutyl, etc. radicals. Radicals that are included within the definition of E of Formulas II and III are hydrogen, methyl, ethyl, propyl, chloro, bromo, iodo, etc. and combinations thereof, and E is preferably hydrogen.

The organopolysiloxane-polycarbonate block copolymers can be made by any technique known to those skilled in the art including the techniques described by Merritt, Merritt, Jr., et al., and Vaughn Jr. in the U.S. patents referenced in the description of the prior art hereinbefore. Accordingly, all of the procedures described in the aforesaid patents relating to methods for the preparation of the organopolysiloxane-polycarbonate block copolymers are incorporated herein in their entirety by reference.

Illustratively presently preferred organopolysiloxane-polycarbonate block copolymers contain repeating units of Formula II, set out herein before wherein X, Y, Z, $\bar{a}$, $\bar{n}$ and $\bar{m}$ are as defined hereafter:

Resin Type "A"

X equals ~7
Y equals ~8 to 10
Z equals ~1
$\bar{a}$ equals ~2
$\bar{n}$ equals ~10

$\overline{m}$ equals $\sim 1$

Resin Type "B"

X equals $\sim 10$
Y equals $\sim 8$ to 10
Z equals $\sim 1$
$\overline{a}$ equals $\sim 2$
$\overline{n}$ equals $\sim 20$
$\overline{m}$ equals $\sim 1$

Resin Type "C"

X equals $\sim 5$
Y equals $\sim 8$ to 10
Z equals $\sim 1$
$\overline{a}$ equals $\sim 2$
$\overline{n}$ equals $\sim 20$
$\overline{m}$ equals $\sim 1$ Blends of polyalkylene terephthalate resins and organopolysiloxane-polycarbonate block copolymers comprise blends of any proportion of the aforesaid resins and copolymers. In general, the presently preferred blend contains at least one percent of an organopolysiloxane-polycarbonate block copolymer. Even more preferably are compositions wherein the organopolysiloxane-polycarbonate block copolymer component is present in an amount of at least about 2–50 percent, and more preferably from about 5–30 percent by weight of the composition.

Since the relative proportion of organopolysiloxane-polycarbonate block copolymer relative to the polyalkylene terephthalate resin effect the physical characteristics of the compositions—the heat distortion temperature as well as the impact properties—the preferred ranges set out above have been selected since optimum heat distortion and impact properties are generally obtained within the preferred proportions noted above.

The flame retardant additive can be any "halogenated copolycarbonate" (HCP) flame retardant additive subject to the proviso that at least an effective proportion of the HCP flame retardant additive is derived from a halogen-substituted dihydric phenol and a dihydric phenol, said halogen preferably being chlorine or bromine. Preferably, the flame retardant (FR)-copolycarbonate is the product of a halogenated bisphenol-A, such as tetrabromobisphenol-A and tetrachlorobisphenol-A and a dihydric phenol such as bisphenol-A. Preferably, the FR-copolycarbonate consists of 75 to 25 weight percent of the product of tetrabromobisphenol-A and, correspondingly, 25 to 75 weight percent of the product of bisphenol-A, based on the weight of the FR-copolycarbonate. Preparation of FR-copolycarbonates can be by any means including those set forth in U.S. Pat. No. 3,334,154 which is incorporated herein in its entirety by reference.

Presently preferred flame-retardant additives are low molecular weight polymers of a carbonate of a halogenated dihydric phenol. More preferred polymers contain from 2 to 10 repeating units of the formula:

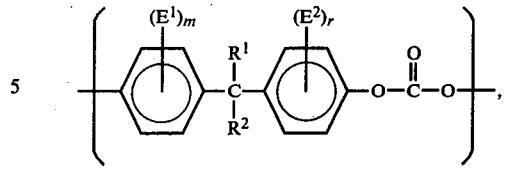

wherein $R^1$ and $R^2$ are hydrogen, (lower)alkyl or phenol, $E^1$ and $E^2$ are bromo or chloro and m and r are from 1 to 4. These polymeric additives have low volatility when heated above 200° C., and a softening point of less than about 300° C. They can be used alone or in combination with FR-synergists, such as inorganic or organic antimony-containing compounds.

In general, the above-referenced halogenated flame retardant copolycarbonate additives can be made by any means known to those skilled in the art, including polymerizing a mixture of a halogenated dihydric phenol and a chain stopper, e.g., an alcohol, carboxylic acid, carboxylic acid halide or, preferably a monohydric phenol, and more preferably a halogenated phenol and phosgene or a reactive derivative thereof in the presence of an acid acceptor, e.g., an amine or caustic. Details concerning the preparation of such compounds are set forth in D. W. Fox's U.S. Pat. No. 3,855,277, issued Dec. 17, 1974 which details are incorporated herein in their entirety by reference.

A presently most preferred flame retardant additive can be made by polymerizing a mixture of tetrabromobisphenol-A and 2,4,6-tribromophenol with phosgene in either methylene chloride in the presence of pyridine or in methylene chloride containing triethylamine in admixture with an aqueous caustic phase. The product of such a process will be a polymer of the formula:

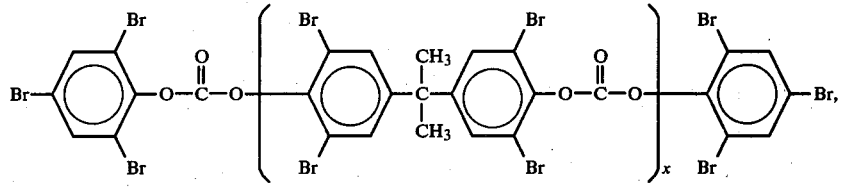

wherein the average number of repeating units x will be from 3 to about 7, and the softening point will be in the range of from 200° to 260° C.

Any amount of flame retardant copolycarbonate can be used providing that the amount if an effective flame retarding amount, e.g., any amount which will increase the oxygen index value of a polyalkylene terephthalate resin and organopolysiloxane-polycarbonate block copolymer blend.

Presently, the FR-copolycarbonate additives are used in amounts of from about 1 to about 50, preferably 5 to 30 parts by weight per 100 parts by weight of polyalkylene terephthalate and organopolysiloxane-polycarbonate block polymer.

Flame retardant additives, as specified above, can be used either alone or in combination with other chemical compounds which will enhance the flame retardant characteristics of the compositions of this invention. Additional flame retardant supplements that can be employed include Group IIA metal oxides, hydroxides, alkoxides, aryloxides and sulfides, including mixtures composed of members of these groups. For example, calcium hydroxide, calcium oxide, magnesium oxide, magnesium terephthalate, calcium terephthalate, calcium acetate and magnesium methoxide may be used effectively. A preferred additive is calcium hydroxide.

Effective additive levels range from about 0.1 to about 10 weight percent. A preferred range is 1.0 to 4 weight percent based on the weight of the polymer blend including the flame retardant copolycarbonate flame retardant additive. In addition to the above supplements, additional flame retardant additive supplements that can be employed are inorganic or organic antimony compounds, such as antimony oxide which can be employed in effective levels of from about 1–10 weight percent, again based on the total weight of the polymer blends including the FR-copolycarbonate.

The type of antimony compound used is not critical, being a choice primarily based on economics. Inorganic antimony compounds, e.g. antimony oxide, ($Sb_2O_3$); antimony phosphate; $KSb(OH)_6$; $NH_4SbF_6$; $SbS_3$; etc., can be used. Organic antimony compounds, e.g. antimony esters of organic acids; cyclic alkyl antimonites; aryl antimonic acids, etc., can be used. Inorganic salts of such compounds, e.g. KSb tartrate, Sb caproate; $Sb(OCH_2CH_3)_3$; $Sb(OCH(CH_3)CH_2CH_3)_3$; Sb polymethylene glycolate; triphenyl antimony, etc., can also be used.

Another presently preferred blend composition comprise a polyalkylene terephthalate resin and an organopolysiloxane-polycarbonate block copolymer containing a reinforcing amount of a reinforcing filler. In general, any reinforcing agent can be used, e.g. fibers, whiskers or platelets of metals, e.g. aluminum, iron or nickel and the like, and nonmetals, e.g. ceramics, carbon filaments, silicates, asbestos, titanium dioxide and titanate whiskers, quartz or glass flakes and fibers and the like. It is to be understood that, unless the filler adds to the strength, stiffness and impact strength of the polymer blends, it is only an extending filler and not a reinforcing filler by definition as contemplated herein.

Although it is not necessary, it is beneficial to have a reinforcing agent present in the compositions in order to obtain the HDT values desired in many mechanical applications. e.g. applications requiring HDT values within the range of from about 130° to 420° F., or even higher. Presently preferred reinforced compositions contain from about 1 percent to about 50 percent, or higher, more preferably from about 5 percent to about 40 percent, and more preferably from about 10 percent to about 30 percent by weight of a reinforcing agent based on total weight of the blend compositions—including the weight of reinforcing agent.

In particular, the preferred reinforcing fillers are of glass, more preferable fibrous glass filaments comprised of lime-aluminum borosilicate glass that is relatively soda free (commonly known as "E" glass) which is used where electrical properties are important. The filaments can be made by any standard process, e.g., by steam or air blowing, flame blowing and mechanical pulling.

Any of the methods well known to the art can be employed in the preparation of the compositions of this invention. Illustrative techniques include mixing of polyalkylene terephthalate (PAT) resin and organopolysiloxane-polycarbonate block copolymer (PS-PC) in powder or granular form, extruding and shaping into pellets or other suitable forms. Any reinforcing agent or any other additive can be added to a PAT and PS-PC composition in any conventional manner, e.g. dry mixing, hot melt mixing, etc., employing an extruder, a heated mill or any other mixing device, such as a Banbury mixer.

The compositions can be molded with any equipment conventionally used for unreinforced or reinforced thermoplastic compositions. For example, good results can be obtained using conventional molding machines, which employ plungers or reciprocating-screws, etc., conventional molding temperatures, e.g. about 450°–500° F., and conventional mold temperatures, e.g. 150° F.

In order that those skilled in the ary may better understand our invention, the following examples are given which are illustrative of the best mode of this invention, however, these examples are not intended to limit the invention in any manner whatsoever. In all the examples, the compositions were prepared in accordance with the following general procedure. Also, in all of the examples, all parts are by weight unless otherwise stated.

GENERAL PROCEDURE

A series of blends were prepared from commercially available materials comprising (A) poly(1,4-butylene terephthalate) having an intrinsic viscosity of 0.8 to 1.5 dl./g., measured at 25° C. in hexafluoroisopropanol, and (B) an organopolysiloxane-polycarbonate block copolymer having an intrinsic viscosity within the range of from 0.6 to 1.5 dl./g. or greater measured at 25° C. in chloroform by dry blending and precompounding in a hot melt extruder. The extrudate was pelletized. For comparative purposes, compositions containing only poly(1,4-butylene terephthalate) were also prepared in pellet form. The resin and copolymer blends, and control compositions were separately molded into appropriate test shapes, e.g. bars, rods, etc.

EXAMPLE I

Several combinations of polybutylene terephthalate and polysiloxane-polycarbonate block copolymer, both unfilled (free of any glass fibers) and filled (containing glass fibers) were blended with a halogenated flame retardant copolycarbonate consisting of 50 weight percent of the product of tetrabromobisphenol-A and 50 weight percent of the product of bisphenol-A. The combinations were blended at 475° F. in a Werner-Pfleiderer twin screw extruder, injection molded in a 35-second cycle in a mold having a mold temperature of 140° F.

A summary of the mechanical properties of the blends with the proportions of polybutylene terephthalate, polysiloxane-polycarbonate block copolymer and flame retardant copolycarbonate is set out in Table I which follows:

TABLE I

Properties of Polybutylene Terephthalate/Polysiloxane-Polycarbonate Block Polymers a Halogenated Copolycarbonate

| Run No. | Composition | Izod Impact Strength (ft lbs/in) Notched (a)* | (b)** | Unnotched (a)* | (b)** | Gardner Impact Strength (in lbs) (a)* | (b)** | Tensile Strength (psi) Yield (a)* | (b)** | Ultimate (a)* | (b)** | Elongation (%) Yield (a)* | (b)** | Ultimate (a)* | (b)** | Tangent Modulus (10^5 psi) (a)* | (b)** | HDT at 264 (°F. psi) (a)* | (b)** | Oxygen Index (a)* | (b)** |
|---|---|---|---|---|---|---|---|---|---|---|---|---|---|---|---|---|---|---|---|---|---|
| | Unfilled(c) Valox 315 | | | | | | | | | | | | | | | | | | | | |
| 1. | Control 0% LR | 0.42 | 0.42 | 9.87 | 9.87 | 21.2 | 21.1 | — | — | 8480 | 8480 | — | — | 4.1 | 4.1 | 3.79 | 3.79 | 160 | 160 | 28.0 | 28.0 |
| 2. | 2% LR | 0.50 | 0.55 | 31.8 | 14.7 | 162.3 | 107.8 | 8270 | — | 8180 | 8250 | 9.2 | — | 12.6 | 7.2 | 3.55 | 3.37 | 151 | 174 | | |
| 3. | 5% LR | 0.66 | 0.89 | 30.6 | 18.5 | 202.7 | 190.7 | 7940 | 7360 | 7750 | 7140 | 7.5 | 6.3 | 14.6 | 12.3 | 3.39 | 3.30 | 162 | 149 | 29.5 | 29.0 |
| 4. | 8% LR | 0.75 | 1.28 | 30.8 | N.B. | 281.5 | 304.3 | 7850 | 6760 | 7650 | 6450 | 7.2 | 4.6 | 15.2 | 14.8 | 3.35 | 2.81 | 165 | 151 | | |
| 5. | 12% LR | 1.08 | 2.33 | N.B. | N.B. | 215.6 | 306.2 | 7210 | 6090 | 7030 | 5670 | 6.0 | 4.6 | 13.0 | 26.1 | 3.00 | 2.72 | 163 | 144 | 30.4 | 29.0 |
| | 30% Glass(d) Valox 300 | | | | | | | | | | | | | | | | | | | | |
| 6. | Control 0% LR | 0.45 | 0.45 | 4.8 | 4.8 | 2.50 | 2.50 | — | — | 9860 | 9860 | — | — | 1.82 | 1.82 | 9.94 | 9.94 | 309 | 309 | 29.8 | 29.0 |
| 7. | 2% LR | 0.59 | 0.50 | 6.2 | 5.1 | 3.00 | 3.40 | — | — | 10210 | 9310 | — | — | 2.08 | 2.06 | 8.70 | 8.85 | 302 | 295 | | |
| 8. | 5% LR | 0.64 | 0.69 | 7.5 | 7.0 | 4.30 | 5.00 | — | — | 9560 | 9330 | — | — | 1.77 | 2.46 | 8.40 | 8.44 | 302 | 295 | 31.7 | 31.0 |
| 9. | 8% LR | 0.76 | 0.97 | 7.5 | 8.6 | 4.60 | 5.00 | — | — | 9450 | 9190 | — | — | 1.71 | 2.25 | 9.83 | 8.45 | 306 | 307 | | |
| 10. | 12% LR | 0.93 | 1.65 | 7.7 | 9.4 | 4.60 | 6.46 | — | — | 8960 | 8960 | — | — | 1.70 | 2.22 | 9.43 | 8.97 | 282 | 320 | 33.5 | 30.0 |

*Blends containing LR-3320 (polysiloxane-polycarbonate block copolymer) Resin Type "A"
**Blends containing LR-5630 (polysiloxane-polycarbonate block copolymer) Resin Type "C"
(c)Unfilled = no fiber glass reinforcement
(d)30% Glass = 30% by weight fiber glass based on combined weight of Valox 315 (PBT) or Valox 300 (PBT)
(e)% LR = % by weight
(f)N.B. = no break at maximum impact energy (32 ft. lbs./in.)

The polyalkylene terephthalate resin and polysiloxane-polycarbonate block copolymers in combination with flame retardant copolycarbonates, both reinforced and unreinforced as defined herein, can be injection, compression and transfer molded into various shaped articles of manufacture, e.g. automotive and appliance utilized articles, extruded to produce films, and other forms having complicated cross-sections as well as cross head extruded hoses, wires, cables and other substrate covers.

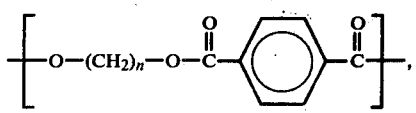

n being a number of from 1 to 50, said resin having an intrinsic viscosity of at least about 0.2 dl./g.

7. The claim 1 blend wherein said copolymer is of the formula:

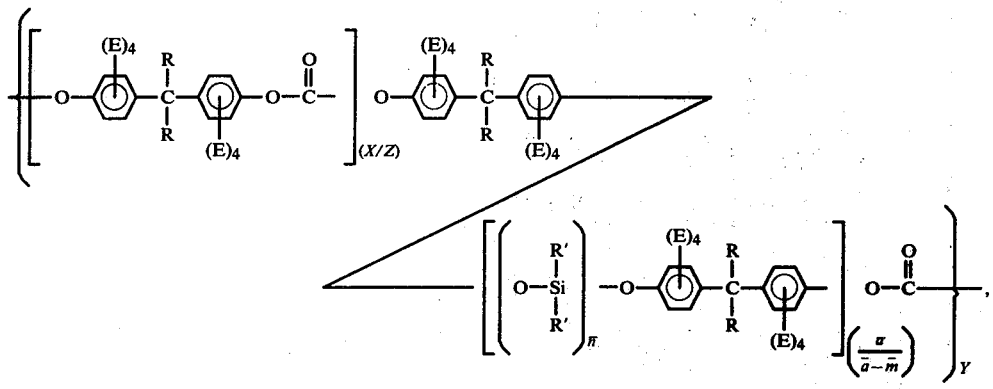

We claim:

1. An improved flame retardant blend comprising a polyalkylene terephthalate resin, an organopolysiloxane-polycarbonate block copolymer and a halogenated copolycarbonate.

2. The claim 1 blend, wherein on a weight basis, the ratio of said copolycarbonate to the polyalkylene terephthalate resin and organopolysiloxane-polycarbonate block copolymer components of the blend is from 99:1 to 1:99.

3. The claim 2 blend, wherein said ratio is from 1:99 to 50:50.

4. The claim 3 blend, further comprising a reinforcing amount of a reinforcing filler.

5. The claim 4 blend, wherein said filler is a fibrous glass filament.

6. The claim 1 blend, wherein said resin is of the formula:

where X is an integer equal to 1 to 1000, inclusive, preferably 2 to 100, $\overline{n}$ is a number average equal to 1 to 100, inclusive, preferably 5 to 40, $\overline{a}$ is a number average equal to 1.1 to 100, $\overline{m}$ is equal to 1, and Z is an integer equal to 1 to 1000, inclusive, preferably 5 to 12, E is a member selected from the class of hydrogen, lower alkyl radicals and halogen radicals and mixtures thereof, R is a member selected from the class of hydrogen, monovalent hydrocarbon radicals and halogenated monovalent hydrocarbon radicals, and R' is a member selected from the class of monovalent hydrocarbon radicals, halogenated monovalent hydrocarbon radicals and cyanoalkyl radicals.

8. The claim 1 blend wherein said flame retardant additive is of the formula:

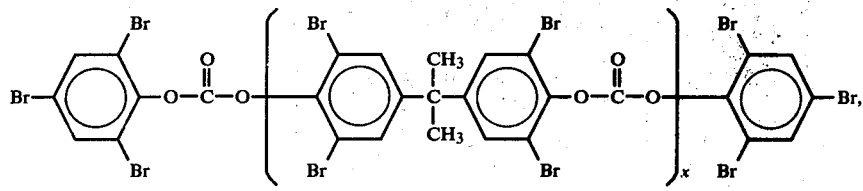

wherein x, the average number of repeating units is from about 3 to about 7, and the softening temperature is from 200° to 260° C.

9. The claim 7 blend wherein X equal ~7; Y equals ~8 to 10; Z equals ~1; $\overline{a}$ equals ~2; $\overline{n}$ equals ~10; and $\overline{m}$ equals ~1.

10. The claim 7 blend wherein X equals ~10; Y equals ~8 to 10; Z equals ~1; $\overline{a}$ equals ~2; $\overline{n}$ equals ~20; and $\overline{m}$ equals ~1.

* * * * *